United States Patent
Zhu et al.

(10) Patent No.: US 9,179,471 B2
(45) Date of Patent: Nov. 3, 2015

(54) COORDINATED SCHEDULING FOR TIME DIVISION DUPLEX NETWORK

(75) Inventors: Huaisong Zhu, Beijing (CN); Jiansong Gan, Beijing (CN); Xinyu Gu, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 88 days.

(21) Appl. No.: 13/996,457

(22) PCT Filed: Dec. 22, 2010

(86) PCT No.: PCT/CN2010/002131
§ 371 (c)(1),
(2), (4) Date: Jun. 20, 2013

(87) PCT Pub. No.: WO2012/083500
PCT Pub. Date: Jun. 28, 2012

(65) Prior Publication Data
US 2013/0265916 A1 Oct. 10, 2013

(51) Int. Cl.
*H04W 72/12* (2009.01)

(52) U.S. Cl.
CPC .......... *H04W 72/12* (2013.01); *H04W 72/1226* (2013.01)

(58) Field of Classification Search
CPC ... H04W 72/04; H04W 72/046; H04W 64/00; H04W 72/12; H04W 72/1231; H04W 72/1226; H04B 7/0697; G01S 5/12; G01S 5/08; G01S 3/28; G01S 5/04; G01S 5/0215; H04L 12/26
USPC ................................. 370/200–420
See application file for complete search history.

(56) References Cited

U.S. PATENT DOCUMENTS

| | | | |
|---|---|---|---|
| 8,190,168 B2 * | 5/2012 | Wong et al. | 455/452.1 |
| 2008/0076439 A1 | 3/2008 | Cho et al. | |
| 2008/0261623 A1 * | 10/2008 | Etemad et al. | 455/456.2 |
| 2009/0318088 A1 * | 12/2009 | Wu et al. | 455/63.4 |
| 2010/0081448 A1 | 4/2010 | Wong et al. | |

(Continued)

FOREIGN PATENT DOCUMENTS

| | | |
|---|---|---|
| CN | 101686078 A | 3/2010 |
| CN | 101784103 A | 7/2010 |
| CN | 101888665 A | 11/2010 |

OTHER PUBLICATIONS

International Search Report, Application No. PCT/CN2010/002131, dated Oct. 13, 2011, 2 pages.

(Continued)

*Primary Examiner* — Charles C Jiang
*Assistant Examiner* — Kyaw Z Soe
(74) *Attorney, Agent, or Firm* — Nicholson De Vos Webster & Elliott LLP

(57) ABSTRACT

The invention relates to Coordinated Scheduling for a Time Division Duplex (TDD) network. In a method for User Equipment (UE) scheduling by a base station in a TDD network, the base station receives scheduling decision from at least one neighboring cell of the base station, and schedules a UE among a plurality of UEs in the serving cell of the base station based on the scheduling decision from the at least one neighboring cell and based on smart antenna information. The inter-cell interference is suppressed and therefore the network performance is improved.

16 Claims, 3 Drawing Sheets

Co-ordination

(56) References Cited

U.S. PATENT DOCUMENTS

2010/0273499 A1* 10/2010 van Rensburg et al. ...... 455/450
2011/0177821 A1* 7/2011 Senarath et al. .............. 455/450

OTHER PUBLICATIONS

International Preliminary Report on Patentability, Application No. PCT/CN2010/002131, Jun. 25, 2013, 6 pages.
Hui, Lin, et al., "Coordinated Beamforming technology in TD-LTE-Advanced system", 2010 International Conference on Communications and Mobile Computing, 2010, 4 pages, IEEE.
Wolz, Benedikt, et al., "Coordination Across Base Stations for Effective Control of Space Division Multiple Access Enhanced IEEE 802.16m Systems", 2009, 5 pages, IEEE.
European Search Report and Written Opinion for Application No. 10860890.2, mailed Sep. 15, 2015, 6 pages.
Qualcomm Europe: "Preliminary CoMP gains for ITU micro scenario", 3GPP TSG-RAN WG1 #57bis, R1-092691, Jun. 29-Jul. 3, 2009, pp. 1-6.
Qualcomm Europe: "Signaling for spatial coordination in DL CoMP", 3GPP TSG-RAN WG1 #58, R1-093141, mailed Aug. 24-28, 2009, pp. 1-10.

* cited by examiner

COORDINATED SCHEDULING FOR TIME DIVISION DUPLEX NETWORK

CROSS-REFERENCE TO RELATED APPLICATIONS

This application is a National stage of International Application No. PCT/CN2010/002131, filed Dec. 22, 2010, which is hereby incorporated by reference.

TECHNICAL FIELD

The present invention generally relates to Coordinated Scheduling (CoSC), particularly to a method for scheduling a User Equipment (UE) in a Time Division Duplex (TDD) network and a communication node for implementing the method.

BACKGROUND

Coordinated Scheduling (CoSC) is discussed in 3rd Generation Partnership Project (3GPP) Release 10, for example, TS36.211, TS36.212 and TS36.213, as a potential tool to improve the coverage and throughput. It refers to a system where the scheduling at multiple, geographically separated sites is dynamically coordinated in order to improve system performance. The coordination can either be distributed, by means of direct communication between the different sites, or by means of a central coordinating node. A typical example of CoSC is that, data to a single UE is instantaneously transmitted from one of the transmission points, while scheduling decisions are coordinated to control e.g. the interference generated in a set of coordinated cells.

FIG. 1 schematically illustrates a scenario of CoSC. A base station coordinates with another base station to decide which UE in its cell may occupy a specific resource (such as time slot) to transmit data in uplink or downlink. As compared with scheduling separately, the CoSC is supposed to increase throughput of the whole system.

Smart antenna technology has been widely used in a TDD system such as Time Division-Long Term Evolution (TD-LTE) and Time Division-Synchronous Code Division Multiple Access (TD-SCDMA) system. The smart antenna is able to identify spatial signal signature such as Angle Of Arrival (AOA) which is also called as Direction of Arrival (DOA) of the signal, and use it to calculate beamforming vectors, to track and locate the antenna beam on the target. Due to the coherence between uplink and downlink, a TDD base station may use AOA information collected in uplink to do downlink beam forming and uplink max ratio combination. In the downlink, the beamforming points to a particular UE and UEs in other directions will suffer less interference; in the uplink, the base station receiver will focus on signal from this UE's direction, hence will be less interfered by signals from other directions. With each UE's real time AOA information, the base station may improve both the uplink and downlink performance.

However, currently the smart antenna is only used for intra-cell interference suppression but not considered by the CoSC.

SUMMARY

Therefore, it is at least an object of the present invention to solve the problem.

According to an aspect of the invention, a method for UE scheduling by a base station in a TDD network is provided. The method comprises receiving scheduling decision from at least one neighboring cell of the base station, and scheduling a UE among a plurality of UEs in the serving cell of the base station based on the scheduling decision from the at least one neighboring cell and based on smart antenna information.

In an embodiment, the smart antenna information may include SNPL of the plurality of UEs in the serving cell, and/or AOA of the plurality of UEs in the serving cell and the UE to be scheduled by the scheduling decision in the at least one neighboring cell. The AOA of the UE to be scheduled by the scheduling decision in the at least one neighboring cell may be obtained via cell coordination or based band pool. Or, the AOA of the UE to be scheduled by the scheduling decision in the at least one neighboring cell may be obtained by receiving RS sequences of the UE to be scheduled by the scheduling decision in the at least one neighboring cell via cell coordination or base band pool and estimating the AOA of the UE to be scheduled by the scheduling decision in the at least one neighboring cell with its respective RS sequences. The AOA of the plurality of UEs in the serving cell may be obtained by estimating the AOA of the plurality of UEs in the serving cell with their respective RS sequences. Scheduling the UE among the plurality of UEs in the serving cell may comprise scheduling among the plurality of UEs in the serving cell a UE whose SNPL is low and/or whose AOA differs more from the AOA of the UE to be scheduled by the scheduling decision in at least one neighboring cell.

In another embodiment, the smart antenna information includes antenna ports in which the plurality of UEs in the serving cell and the UE to be scheduled by the scheduling decision in the at least one neighboring cell are located. Scheduling the UE among the plurality of UEs in the serving cell may comprise scheduling among the plurality of UEs in the serving cell a UE which is located in a first antenna port, wherein an area covered by the first antenna port is not adjacent to an area covered by a second antenna port in which the UE to be scheduled by the scheduling decision in at least one neighboring cell is located.

The base station may send the scheduling decision of the serving cell to the at least one neighboring cells. The TDD network may be a TD-SCDMA network or a TD-LTE network.

According to another aspect of the invention, a base station in a TDD network is provided. The base station comprises a transceiver adapted to receive scheduling decision from at least one neighboring cell of the base station, and a processing unit adapted to schedule a UE among a plurality of UEs in the serving cell of the base station based on the scheduling decision from the at least one neighboring cell and smart antenna information.

The smart antenna information may include SNPL of the plurality of UEs in the serving cell, and/or AOA of the plurality of UEs in the serving cell and the UE to be scheduled by the scheduling decision in the at least one neighboring cell.

The transceiver may be adapted to receive the AOA of the UE to be scheduled by the scheduling decision in the at least one neighboring cell via cell coordination or based band pool. The transceiver may be adapted to receive RS sequences of the UE to be scheduled by the scheduling decision in the at least one neighboring cell via cell coordination or base band pool, and the processing unit may be adapted to estimate the AOA of the UE to be scheduled by the scheduling decision in the at least one neighboring cell with its respective RS sequences and/or estimate the AOA of the plurality of UEs in the serving cell with their respective RS sequences. The processing unit may be further adapted to schedule among the plurality of UEs in the serving cell a UE whose SNPL is low and/or whose AOA differs more from the AOA of the UE to be scheduled by the scheduling decision in at least one neighboring cell.

The smart antenna information may include antenna ports in which the plurality of UEs in the serving cell and the UE to be scheduled by the scheduling decision in the at least one neighboring cell are located. The processing unit may be further adapted to schedule among the plurality of UEs in the serving cell a UE which is located in a first antenna port, wherein an area covered by the first antenna port is not adjacent to an area covered by a second antenna port in which the UE to be scheduled by the scheduling decision in at least one neighboring cell is located.

The transceiver may be further adapted to send the scheduling decision of the serving cell to the at least one neighboring cells. The TDD network may be a TD-SCDMA network or a TD-LTE network.

According to a further aspect of the invention, a TDD network which comprises the base station as describe above is proved.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
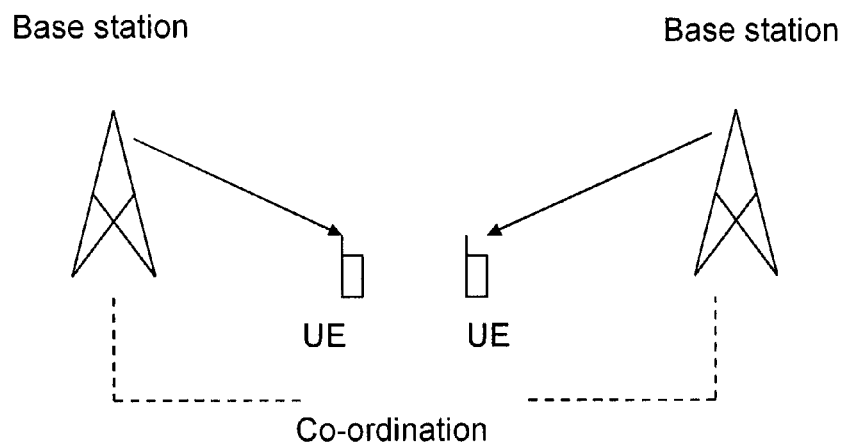
FIG. 1 schematically illustrates a scenario of CoSC.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus, networks (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

In many cases, inter-cell interference is a dominant factor to the network performance. Take TD-SCDMA High Speed Packet Access (HSPA)/High Speed Packet Access Evolution (HSPA+) as an example. Typically, specific timeslots are reserved for HSPA services throughout network, and a base station only uses Time Division Multiplexing (TDM) schedule, which means that in one timeslot, only one UE is scheduled with HSPA service in each cell. For example, a first base station serving a first cell schedules or decides that a first UE in the first cell is to transmit or receive HSPA data in a specific time slot, while a second base station serving a second cell schedules or decides that a second UE in the second cell is to transmit or receive HSPA data in that specific time slot. In this case, the interference to the second UE in the second cell in that specific time slot mainly comes from the signal from the first cell, in other words, inter-cell interference is one of the most key factors for the TD-SCDMA HSPA/HSPA+ performance.

It is therefore proposed to make use of the smart antenna in CoSC to suppress the inter-cell interference.

Figure 2:
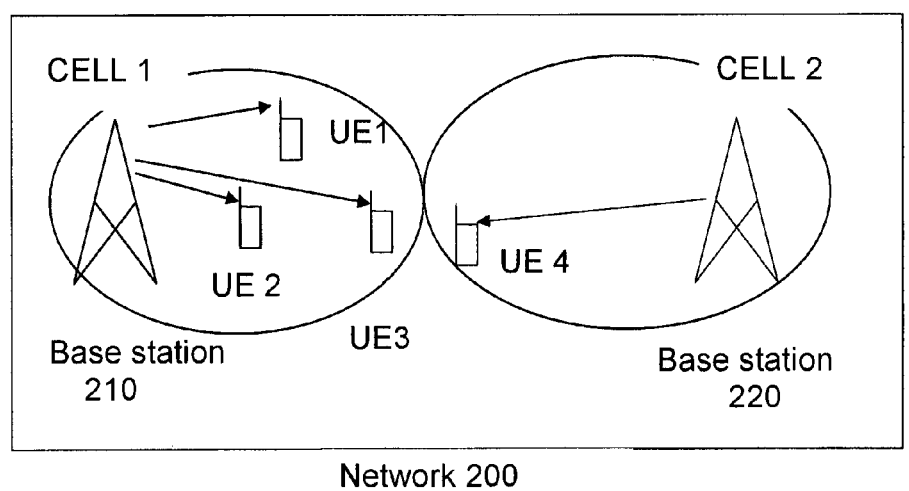
FIG. 2 schematically illustrates an outdoor CoSC scenario in accordance with an embodiment of the invention.

FIG. 2 schematically illustrates an outdoor CoSC scenario in accordance with an embodiment of the invention.

For sake of clarity and simplicity, only two adjacent cells of a TD-SCDMA network 200, Cell 1 and Cell 2, are illustrated in FIG. 2. In the Cell 1, a base station 210 is serving three UEs, UE1, UE2 and UE3. In the Cell 2, a base station 220 is serving one UE4. Again, taking the above example of HSPA/HSPA+ service, both the base station 210 and the base station 220 have to schedule which UE in the respective cell is to transmit or receive HSPA data in a specific time slot. By CoSC, the two cells (base stations) may coordinate to make the scheduling decision. Assume that the base station 220 has a high priority in CoSC than the base station 210, and has made a scheduling decision that the UE4 is to occupy the specific time slot.

The base station 210, after receiving the scheduling decision from the neighboring cell, knows that the UE4 is to be scheduled in the neighboring cell. The base station 210 then schedules a UE among the UE1 to UE3 in the Cell 1 so that the communication between the scheduled UE and the base station 210 will generate as less as possible interference in the specific time slot to the communication between the UE4 and the base station 220. Assume that the specific time slot is for uplink transmission. In order to suppress the interference to the Cell 2, the base station may consider at least the following smart antenna information in selecting a UE in the Cell 1:

Serving and Neighboring cell Path Loss ratio (SNPL); and
AOA.

The SNPL may be measured by the UE and reported period to the base station. A high SNPL indicates a high serving cell path loss and a relatively low neighboring cell path loss, which usually happens when a UE is located at the edge of its serving cell. Such a UE may generate high interference to the neighboring cell. As shown in FIG. 2, among the three UEs in the Cell 1, the UE3 is located at the edge of the Cell 1 and has a relatively high SNPL. The base station 210 will try to avoid scheduling the UE3 to transmit data in uplink in the specific time slot, since the UE3 is located near the Cell 2 and would generate in the specific time slot more interference to UE4's data transmission in the Cell 2 than the UE1 and UE2.

In addition, AOA of the UE1 to UE3 and AOA of the UE4 may be considered. As shown in FIG. 2, the beams of the smart antenna are directional and point to particular UEs. The beam for the UE4 formed by the antenna of the base station 220 is in the same or similar direction as that for the UE2 and UE3 formed by the antenna of the base station 210, in other words, the AOA of the UE2 and UE3 is substantially the same as the AOA of the UE4. Due to the proximity of AOA, the UE2 and UE3 would generate in the specific time slot more interference to UE4's data transmission in the Cell 2.

In the above example as shown in FIG. 2, as compared with the UE2 and UE3, the UE1 has a low SNPL, and its AOA differs more from the AOA of the UE4. The base station 210 may schedule the UE1 so that it will generate less inter-cell interference to UE4's data transmission in the Cell 2.

The scheduling in the case that the specific time slot is for downlink transmission may consider the same information, except that if the base station 210 uses the same transmitting power in downlink transmission for the UE1 to UE3, the SNPL of each of the UE1 to UE3 may be ignored. The base station 210 may make the scheduling decision mainly based on the AOA of the UE1 to UE3 and that of the UE4. If the data to be transmitted in both cells are the same (such as for broadcasting), both the base station 210 and the base station 220 may benefit from spacial multiplexing gain caused by different AOA.

It should be noted that the base station 210 may receive the scheduling decision of the base station 220 and obtain the antenna information by all possible methods, for example, via cell coordination or based band pool. For example, the base station 210 may obtain the AOA of the UE4 from the base station 220 via cell coordination or based band pool, or by receiving Reference Symbol (RS) sequences of the UE4 from the base station 220 via cell coordination or base band pool and estimating the AOA of the UE4 with its respective RS sequences. The base station 210 may obtain the AOA of the UE1 to UE3 by estimating with their respective RS sequences. How to estimate the AOA with RS sequences is already known to a person skilled in the art and will not be discussed in detail.

The base station 210 may send its scheduling decision to the base station 220 (Cell 2). By sharing the scheduling decisions between the two base stations, each base station has the knowledge of the scheduling decision of the other and thus may use this knowledge for its subsequent scheduling.

Figure 3:
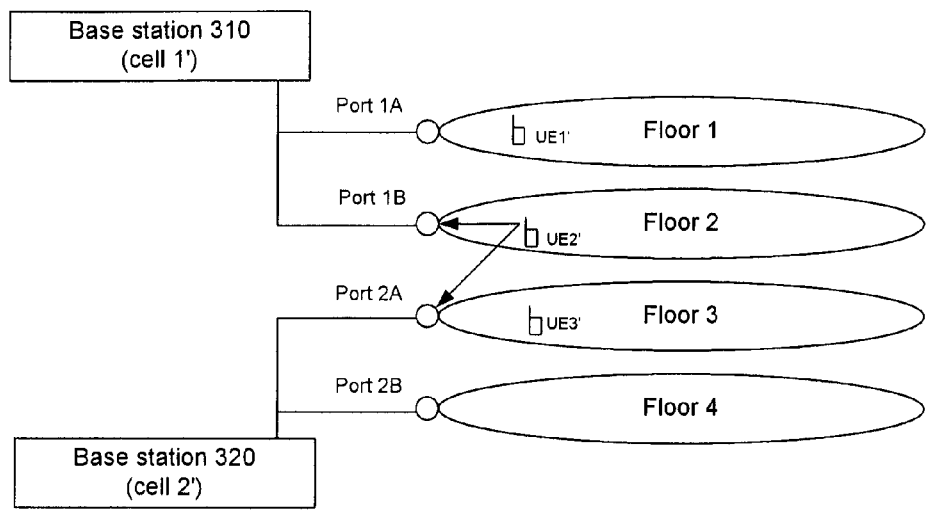
FIG. 3 schematically illustrates an indoor CoSC scenario in accordance with another embodiment of the invention.

FIG. 3 schematically illustrates an indoor CoSC scenario in accordance with another embodiment of the invention.

The network deployment as illustrated in FIG. 3 is a typical deployment inside buildings. In this deployment, Cell 1' served by a first base station 310 and Cell 2' served by a base station 320 cover two different in-building areas respectively, and in each cell multiple antenna ports are used to further cover certain finer in-building areas. For example, the antenna ports 1A and 1B of the Cell 1, and antenna ports 2A and 2B cover the Floor 1 to Floor 4 respectively, as shown in FIG. 3. The UE1', UE2' and UE3' are located in the antenna ports 1A, 1B and 2A respectively.

Again, taking the example of HSPA/HSPA+ service, and assume that the second base station 320 has a high priority in CoSC than the first base station 310, and has made a scheduling decision that the UE3' located in antenna port 2A is to occupy the specific time slot.

The base station 310, after receiving the scheduling decision from the neighboring cell, knows that the UE3' is to be scheduled in the neighboring cell. When scheduling a UE among the UE1' and UE2', the base station 310 may consider the information on antenna ports in which the UE1', UE2' and UE3' are located. As can be seen from FIG. 3, the UE2' located in antenna port 1B would generate in the specific time slot more inter-cell interference to data transmission of UE3' than UE1', since the area covered by the antenna port 1B is near the area covered by the antenna port 2A. The base station 310 may schedule the UE1' to suppress the inter-cell interference.

The above examples are discussed with a relatively simple model of CoSC between two base stations (cells) one of which has a higher priority than the other. In practice the CoSC model might be more complicated, e.g. there are more than one candidate UE in the serving cell, or there are more than two base stations (cells) are involved in the CoSC and the relation among them are not simply master/slave. Nevertheless, the inventive concept of the invention may be applied to such a complicated model as well. Any time one base station is making its scheduling decision, it may take into account the scheduling decision(s) from other base station(s) (cells) and smart antenna information such as SNPL, AOA and antenna ports. The base station may decide to schedule a UE which will generate less interference to UE(s) as scheduled in other cells in view of SNPL, AOA and antenna ports.

In case that a UE initially access the network and the base station has not determined its smart antenna information such as AOA yet, the base station may assume this UE have high interference in any possible directions for neighboring cells and does not schedule it until its smart antenna information is known.

In case that there is more than one candidate UE in the serving cell of the base station, the base station may use various algorithms, such as weighting, to pick out an optimal UE to schedule. For example, there are two candidate UEs in the serving cell, one with a low SNPL but an AOA differing less from the AOA of the UE(s) to be scheduled in other cells, the other with a high SNPL but an AOA differing more from the AOA of the UE(s) to be scheduled in other cells. The two factors, SNPL and AOA, are not coincident. The base station may qualify each factor into a numerical value, give a weight to each factor, calculate an integration score for each UE, and pick out the UE with the higher score. Alternatively, the base station may simply randomly pick out one from the candidates. The criterion to decide the UE to be scheduled may vary depending on the design requirement, system implementation, etc. The criterion might not be always optimal, however, as long as the scheduling decision(s) from other base station(s) and smart antenna information are considered, the base station is likely to schedule a UE which cause less inter-cell interference.

In case that there are more than two base stations are involved in the CoSC and the relation among them are not simply master/slave, the base stations may not only consider the scheduling decisions from others but also influence the others with its scheduling decisions. For example, one base station may receive the scheduling decisions from other base stations and make a scheduling decision based on the scheduling decisions from other base stations and smart antenna information such as SNPL, AOA and antenna ports. The base station in turn, may share its scheduling decision with other base stations as a feedback, and the other base stations may modify their scheduling decisions in view of the feedback. The interactions may last several rounds before the final scheduling decisions are made. The final scheduling decisions may be optimal or suboptimal in making the overall inter-cell interference among the cells minimal. As an alternative, one of the base stations may play the role of master and consider all the scheduling decision and smart antenna information and make optimal or suboptimal scheduling decisions for all the cells so that the overall inter-cell interference among the cells minimal. The coordination among base stations may vary depending on the design requirement, system implementation, etc. Nevertheless, as long as the scheduling decision(s) from other base station(s) and smart antenna information are considered, the inter-cell interference may be suppressed.

In addition to the SNPL and AOA, other factors such as inter-cell isolation degree, including antenna tilt angle, cell range, air environments etc. may be considered during scheduling. A more isolated UE, e.g. a UE blocked from its neighboring cell by a wall, will generally generate less interference to its neighboring cell.

Figure 4:
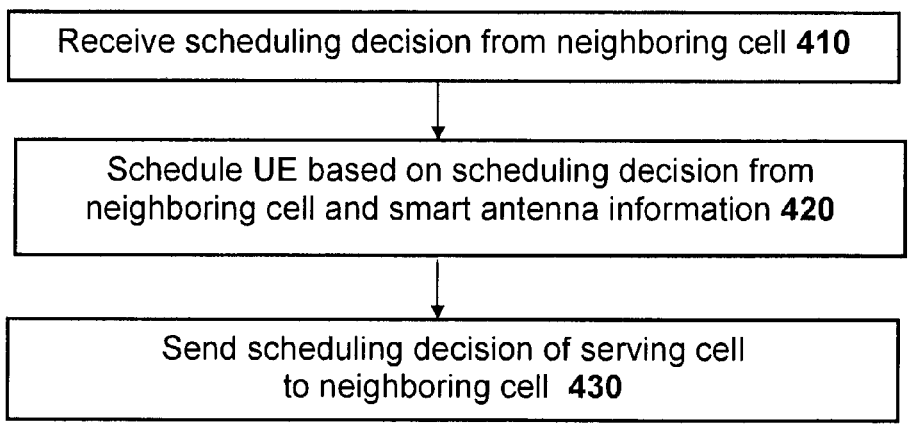
FIG. 4 is a flowchart illustrating a method for UE scheduling by a base station in a TDD network in accordance with an inventive concept of the invention.

FIG. 4 is a flowchart illustrating a method for UE scheduling by a base station in a TDD network in accordance with an inventive concept of the invention.

At step 410, the base station receives scheduling decision from at least one neighboring cell of the base station. At step 420, the base station schedules a UE among a plurality of UEs in the serving cell of the base station based on the scheduling decision from the at least one neighboring cell and based on smart antenna information.

In an embodiment, the smart antenna information may include SNPL of the plurality of UEs in the serving cell, AOA of the plurality of UEs in the serving cell and AOA of the UE to be scheduled by the scheduling decision in the at least one neighboring cell. The AOA of the UE to be scheduled by the scheduling decision in the at least one neighboring cell may be obtained via cell coordination or based band pool. Or, the AOA of the UE to be scheduled by the scheduling decision in the at least one neighboring cell may be obtained by receiving RS sequences of the UE to be scheduled by the scheduling decision in the at least one neighboring cell via cell coordination or base band pool and estimating the AOA of the UE to be scheduled by the scheduling decision in the at least one neighboring cell with its respective RS sequences. The AOA of the plurality of UEs in the serving cell may be obtained by estimating the AOA of the plurality of UEs in the serving cell with their respective RS sequences. The step 420 of scheduling the UE among the plurality of UEs in the serving cell may comprise scheduling among the plurality of UEs in the serving cell a UE whose SNPL is low and/or whose AOA differs more from the AOA of the UE to be scheduled by the scheduling decision in at least one neighboring cell.

In another embodiment, the smart antenna information includes antenna ports in which the plurality of UEs in the serving cell and the UE to be scheduled by the scheduling decision in the at least one neighboring cell are located. The step 420 of scheduling the UE among the plurality of UEs in the serving cell may comprise scheduling among the plurality of UEs in the serving cell a UE which is located in a first antenna port, wherein an area covered by the first antenna port is not adjacent to an area covered by a second antenna port in which the UE to be scheduled by the scheduling decision in at least one neighboring cell is located.

Optionally, the base station may send the scheduling decision of the serving cell to the at least one neighboring cells at step 430.

Figure 5:
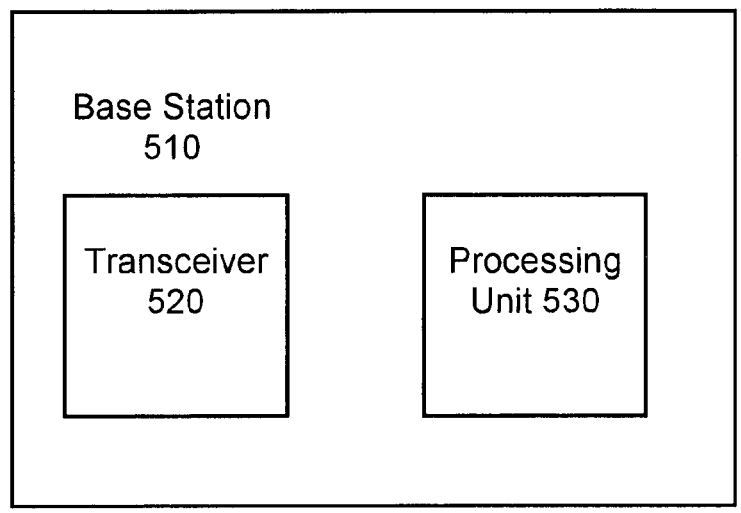
FIG. 5 is a schematic block diagram of the base station according to an inventive concept of the invention.

FIG. 5 is a schematic block diagram of the base station according to an inventive concept of the invention.

As shown in FIG. 5, the base station 510 comprises a transceiver 520 adapted to receive scheduling decision from at least one neighboring cell of the base station, and a processing unit 530 adapted to schedule a UE among a plurality of UEs in the serving cell of the base station based on the scheduling decision from the at least one neighboring cell and smart antenna information.

The smart antenna information may include SNPL of the plurality of UEs in the serving cell, and/or AOA of the plurality of UEs in the serving cell and the UE to be scheduled by the scheduling decision in the at least one neighboring cell.

Transceiver 520 may be adapted to receive the AOA of the UE to be scheduled by the scheduling decision in the at least one neighboring cell via cell coordination or based band pool. The transceiver 520 may be adapted to receive RS sequences of the UE to be scheduled by the scheduling decision in the at least one neighboring cell via cell coordination or base band pool, and the processing unit 530 may be adapted to estimate the AOA of the UE to be scheduled by the scheduling decision in the at least one neighboring cell with its respective RS sequences and/or estimate the AOA of the plurality of UEs in the serving cell with their respective RS sequences. The processing unit 530 may be further adapted to schedule among the plurality of UEs in the serving cell a UE whose SNPL is low and/or whose AOA differs more from the AOA of the UE to be scheduled by the scheduling decision in at least one neighboring cell.

The smart antenna information may include antenna ports in which the plurality of UEs in the serving, cell and the UE to be scheduled by the scheduling decision in the at least one neighboring cell are located. The processing unit 530 may be further adapted to schedule among the plurality of UEs in the serving cell a UE which is located in a first antenna port, wherein an area covered by the first antenna port is not adjacent to an area covered by a second antenna port in which the UE to be scheduled by the scheduling decision in at least one neighboring cell is located.

The transceiver 520 may be further adapted to send the scheduling decision of the serving cell to the at least one neighboring cells.

By making the scheduling decision based scheduling decision from neighboring cell(s) and smart antenna information, the inter-cell interference is suppressed and therefore the network performance is improved. In addition, the proposed CoSC solution does not need any modification to existing UEs.

In the above description, the term base station and UE is used herein, but it should be understood that there are other terms such as Node B, eNode B and mobile station as used in different standards or protocols to refer to the same or like entities. The invention may be applied to any communication entities that deal with the CoSC. Although the invention is described in a context of TD-SCDMA HSPA/HSPA+, it should be understand that the invention may be applied to all type of TDD network using smart antenna technology and all type of services.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A method for User Equipment (UE) scheduling by a base station in a Time Division Duplex (TDD) network comprising:
   receiving a scheduling decision for a time slot from at least one neighboring cell of the base station; and
   scheduling a UE among a plurality of UEs for the time slot in a serving cell of the base station based on the scheduling decision received from the at least one neighboring cell and based on smart antenna information, wherein the smart antenna information includes at least one of:
   Serving and Neighboring cell Path Loss ratio (SNPL) of the plurality of UEs in the serving cell; and
   Angle of Arrival (AOA) of the plurality of UEs in the serving cell and at least one UE to be scheduled in the at least one neighboring cell by the scheduling decision, wherein the AOA of the at least one UE in the at least one neighboring cell to be scheduled by the scheduling decision is obtained by:
      receiving Reference Symbol (RS) sequences of the at least one UE, in the at least one neighboring cell to be scheduled by the scheduling decision via cell coordination or base band pool; and
      estimating the AOA of the at least one UE in the at least one neighboring cell to be scheduled by the scheduling decision with its respective RS sequences, and wherein the AOA of the plurality of UEs in the serving cell is obtained by estimating the AOA of the plurality of UEs in the serving cell with their respective RS sequences.

2. The method of claim 1, wherein the AOA of the at least one UE to be scheduled in the at least one neighboring cell by the scheduling decision is obtained via cell coordination or based band pool.

3. The method of claim 1, wherein the smart antenna information includes antenna ports in which the plurality of UEs in the serving cell and at least one UE in the at least one neighboring cell to be scheduled by the scheduling decision are located.

4. The method of claim 1, wherein scheduling the UE among the plurality of UEs in the serving cell comprises:
   scheduling among the plurality of UEs in the serving cell the UE based on at least one of whose SNPL is low and whose AOA differs more from the AOA of the at least one UE in the at least one neighboring cell to be scheduled by the scheduling decision.

5. The method of claim 1, scheduling the UE among the plurality of UEs in the serving cell comprises:
   scheduling among the plurality of UEs in the serving cell the UE that is located in a first antenna port, wherein an area covered by the first antenna port is not adjacent to an area covered by a second antenna port in which the at least one UE to be scheduled in the at least one neighboring cell by the scheduling decision is located.

6. The method of claim 1, further comprising:
   sending the scheduling decision of the serving cell to the at least one neighboring cell.

7. The method of claim 1, wherein the TDD network is a Time Division-Synchronous Code Division Multiple Access (TD-SCDMA) network or a Time Division-Long Term Evolution (TD-LTE) network.

8. A base station in a Time Division Duplex (TDD) network, comprising:
   a transceiver adapted to receive a scheduling decision for a time slot from at least one neighboring cell of the base station; and
   a processing unit adapted to schedule a UE among a plurality of UEs for the time slot in a serving cell of the base station based on the scheduling decision received from the at least one neighboring cell and based on smart antenna information, wherein the smart antenna information includes at least one of:
   Serving and Neighboring cell Path Loss ratio (SNPL) of the plurality of UEs in the serving cell; and
   Angle of Arrival (AOA) of the plurality of UEs in the serving cell and at least one UE to be scheduled in the at least one neighboring cell by the scheduling decision, wherein the transceiver is adapted to receive Reference Symbol (RS) sequences of the at least one UE to be scheduled in the at least one neighboring cell by the scheduling decision via cell coordination or base band pool, and wherein the processing unit is adapted to estimate the AOA of the at least one UE to be scheduled in the at least one neighboring cell by the scheduling decision with its respective RS sequences and estimate the AOA of the plurality of UEs in the serving cell with their respective RS sequences.

9. The base station of claim 8, wherein the transceiver is adapted to receive the AOA of the at least one UE to be scheduled in the at least one neighboring cell by the scheduling decision via cell coordination or based band pool.

10. The base station of claim 8, wherein the smart antenna information includes antenna ports in which the plurality of UEs in the serving cell and at least one UE to be scheduled in the at least one neighboring cell by the scheduling decision are located.

11. The base station of claim 8, wherein the processing unit is further adapted to:
   schedule among the plurality of UEs in the serving cell the UE based on at least one of whose SNPL is low and whose AOA differs more from the AOA of the at least one UE to be scheduled in the at least one neighboring cell by the scheduling decision.

12. The base station of claim 8, wherein the processing unit is further adapted to:
   schedule among the plurality of UEs in the serving cell the UE that is located in a first antenna port, wherein an area covered by the first antenna port is not adjacent to an area covered by a second antenna port in which the at least one UE to be scheduled in the at least one neighboring cell by the scheduling decision is located.

13. The base station of claim 8, wherein the transceiver is further adapted to send the scheduling decision of the serving cell to the at least one neighboring cell.

14. The base station of claim 8, wherein the TDD network is a Time Division-Synchronous Code Division Multiple Access (TD-SCDMA) network or a Time Division-Long Term Evolution (TD-LTE) network.

15. A Time Division Duplex (TDD) network comprising a base station, the base station comprising:
- a transceiver adapted to receive a scheduling decision for a time slot from at least one neighboring cell of the base station; and
- a processing unit adapted to schedule a UE among a plurality of UEs for the time slot in a serving cell of the base station based on the scheduling decision received from the at least one neighboring cell and based on smart antenna information, wherein the smart antenna information includes at least one of:
  - Serving and Neighboring cell Path Loss ratio (SNPL) of the plurality of UEs in the serving cell; and
  - Angle of Arrival (AOA) of the plurality of UEs in the serving cell and at least one UE to be scheduled in the at least one neighboring cell by the scheduling decision, wherein the transceiver is adapted to receive Reference Symbol (RS) sequences of the at least one UE to be scheduled in the at least one neighboring cell by the scheduling decision via cell coordination or base band pool, and wherein the processing unit is adapted to estimate the AOA of the at least one UE to be scheduled in the at least one neighbouring cell by the scheduling decision with its respective RS sequences and estimate the AOA of the plurality of UEs in the serving cell with their respective RS sequences.

16. The TDD network of claim 15, wherein the TDD network is a Time Division-Synchronous Code Division Multiple Access (TD-SCDMA) network or a Time Division-Long Term Evolution (TD-LTE) network.

\* \* \* \* \*

UNITED STATES PATENT AND TRADEMARK OFFICE
CERTIFICATE OF CORRECTION

Page 1 of 1

PATENT NO. : 9,179,471 B2
APPLICATION NO. : 13/996457
DATED : November 3, 2015
INVENTOR(S) : Zhu et al.

It is certified that error appears in the above-identified patent and that said Letters Patent is hereby corrected as shown below:

IN THE SPECIFICATION

In Column 5, Line 49, delete "spacial" and insert -- spatial --, therefor.

In Column 8, Line 47, delete "serving," and insert -- serving --, therefor.

IN THE CLAIMS

In Column 9, Line 42, in Claim 1, delete "UE," and insert -- UE --, therefor.

Signed and Sealed this
First Day of March, 2016

Michelle K. Lee
*Director of the United States Patent and Trademark Office*